(12) United States Patent
Hayashi et al.

(10) Patent No.: US 11,820,295 B2
(45) Date of Patent: Nov. 21, 2023

(54) DETACHABLE MIXED-SOURCE PORTABLE SPEAKERS

(71) Applicant: Harman International Industries, Incorporated, Stamford, CT (US)

(72) Inventors: Naoki Hayashi, Ann Arbor, MI (US);
Craig LaMontagne, Milford, MI (US);
Kim Fiskbæk Andreasen, Vildbjerg (DK); Matthew Christopher Marrocco, Lathrup Village, MI (US);
Mark Stephen Pisaneschi, Brighton, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 109 days.

(21) Appl. No.: 17/444,628

(22) Filed: Aug. 6, 2021

(65) Prior Publication Data

US 2023/0042118 A1 Feb. 9, 2023

(51) Int. Cl.
*H02J 7/00* (2006.01)
*H04R 1/02* (2006.01)
*H04R 1/10* (2006.01)
*B60R 11/02* (2006.01)
*H04W 4/80* (2018.01)

(52) U.S. Cl.
CPC ........ *B60R 11/0217* (2013.01); *H02J 7/0044* (2013.01); *H04R 1/025* (2013.01); *H04R 1/1041* (2013.01); *H04W 4/80* (2018.02); *H04R 2420/07* (2013.01); *H04R 2499/13* (2013.01)

(58) Field of Classification Search
CPC .... B60R 11/0217; H02J 7/0044; H04R 1/025; H04R 1/1041; H04R 2420/07; H04R 2499/13; H04W 4/80
See application file for complete search history.

(56) References Cited

U.S. PATENT DOCUMENTS 9,888,305 B2   2/2018 Prommersberger et al.
10,869,128 B2 * 12/2020 Qian ................. H04S 3/008
(Continued)

FOREIGN PATENT DOCUMENTS

EP       3860143 A2      8/2021
JP    H11254864 A  *   9/1999   ............ B42D 15/02
JP     H1094026 A  *   6/2003   ............. H04Q 7/32

OTHER PUBLICATIONS

European Patent Office, Extended European Search Report Issued in Application No. 22183370.0, dated Jan. 3, 2023, Germany, 8 pages.

*Primary Examiner* — Oyesola C Ojo
(74) *Attorney, Agent, or Firm* — McCoy Russell LLP

(57) ABSTRACT

Methods and systems are provided for use of a portable speaker system both as part of a vehicular audio system and as a stand-alone audio system. A speaker may be attached to an internal speaker receptacle of a vehicle and coupling to an audio amplifier of the vehicle. Audio performances received by the speaker from the audio amplifier may then be played by the speaker. The speaker may also be decoupling from the audio amplifier of the vehicle and detached from the internal speaker receptacle of the vehicle. Audio performances received by the speaker from a wireless interface coupled to the speaker may then be played by the speaker.

18 Claims, 6 Drawing Sheets

(56) References Cited

U.S. PATENT DOCUMENTS

| | | | |
|---|---|---|---|
| 2007/0127742 A1* | 6/2007 | Seven | H03F 3/45071 |
| | | | 381/111 |
| 2007/0298754 A1* | 12/2007 | Alves | H04B 1/082 |
| | | | 455/350 |
| 2011/0306299 A1* | 12/2011 | Wells | A43B 1/0072 |
| | | | 455/41.3 |
| 2014/0098976 A1* | 4/2014 | Liu | H03G 3/004 |
| | | | 381/120 |
| 2016/0261954 A1* | 9/2016 | Petroff | H03G 5/165 |
| 2016/0268986 A1* | 9/2016 | Otani | H03F 1/327 |
| 2017/0013349 A1* | 1/2017 | Wippler | H04R 3/12 |
| 2017/0105069 A1* | 4/2017 | Mezzomo | H04R 1/026 |
| 2017/0142508 A1* | 5/2017 | Prommersberger | H04R 1/026 |
| 2018/0160207 A1 | 6/2018 | Prommersberger et al. | |
| 2019/0006855 A1* | 1/2019 | MacDonald | H02J 7/04 |
| 2020/0238872 A1 | 7/2020 | Switalski | |

* cited by examiner

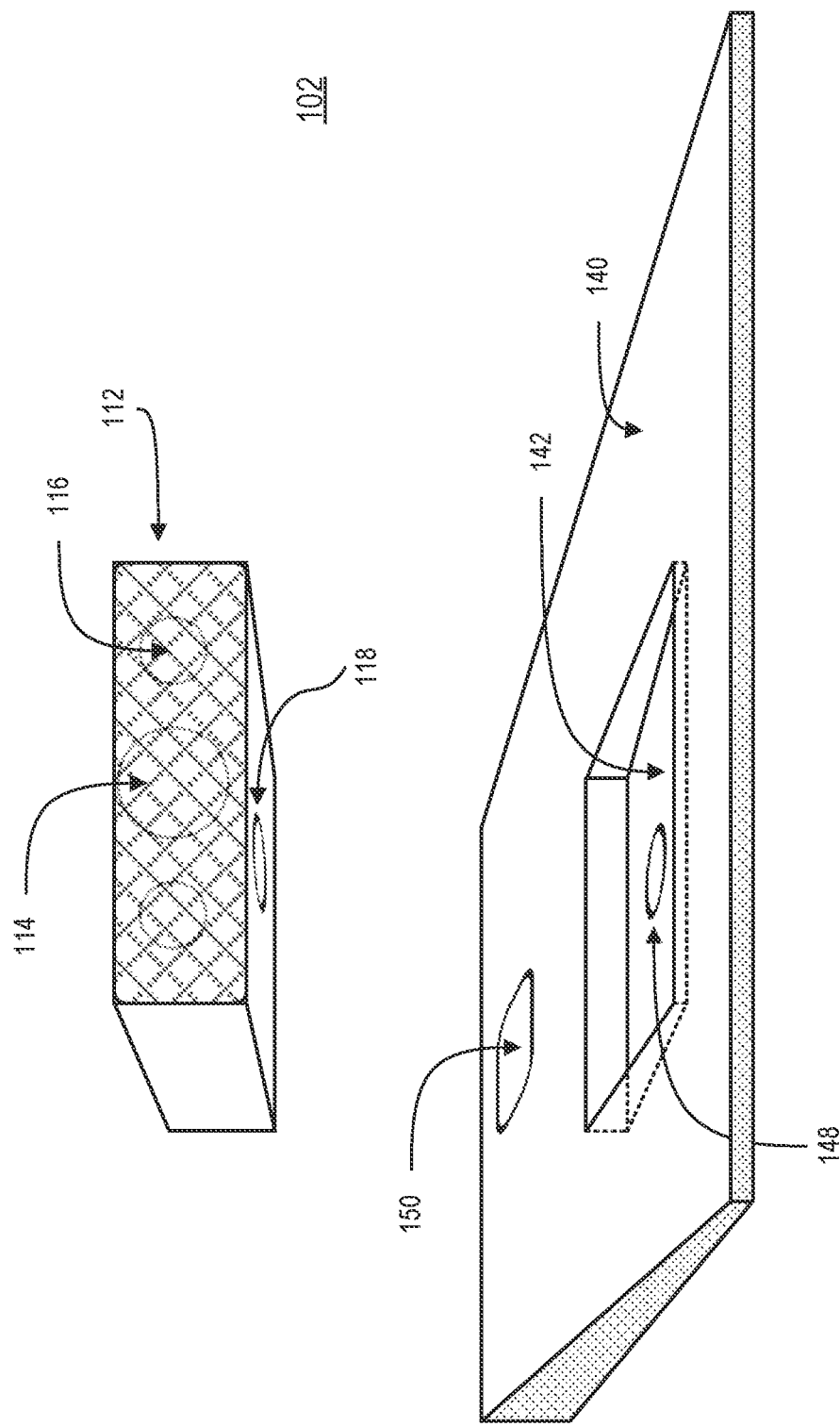

DETACHABLE MIXED-SOURCE PORTABLE SPEAKERS

FIELD

The disclosure relates to the use of portable speaker systems both inside of and outside of vehicles.

BACKGROUND

In conventional vehicular audio systems, audio performances are played through speakers permanently integrated into the vehicle, such as at various locations around a perimeter of the vehicle's cabin. Meanwhile, audio performance may also be played through portable speaker systems, which users might carry with them into the cabin of the vehicle.

However, upon reaching a destination and exiting a vehicle with a conventional vehicular audio system, users of the vehicle must leave the speakers of the audio system behind, although they might desire the ability to play audio performances outside the vehicle. At the same time, users of portable speaker systems often set those speaker systems aside when entering a vehicle, where they become redundant devices (and become an additional matter to remember and manage).

SUMMARY

As disclosed herein, a portable speaker system, which may be capable of playing audio performances received over a wireless communications link, may be removably fixed to a panel of a vehicle's interior. The portable speaker system may be mechanically attached to the vehicular panel, and may be electrically and/or electronically coupled to an audio amplifier of the vehicle. In some embodiments, the portable speaker system may be located on a dashboard of the vehicle, such as at a central portion of the dashboard, and once docked the portable speaker system may serve as a speaker of an audio system of the vehicle, such as by serving as a central speaker of the audio system.

When integrated into the vehicular audio system, the portable speaker system may play audio supplied by an audio amplifier of the vehicle. Aside from electrical circuitry within the portable speaker system for charging a battery of the portable speaker system, part of or substantially all of the electrical and/or electronic components and circuitries of the portable speaker system may be set to a low power state (e.g., a lower power state than a power state during stand-alone operation of the speaker system), or may be powered down entirely.

When removed from the vehicular audio system, the portable speaker system may play audio supplied by a wireless communications link, such as a Bluetooth® link. (Bluetooth® is a registered trademark of the Bluetooth Special Interest Group, Incorporated, headquartered in Kirkland, Wash.) The electrical components and circuitries of the portable speaker system may then be powered by the battery of the portable speaker system, and the speaker system may be charged by an external charge source (e.g., via a USB-C connection).

In some embodiments, portable speaker systems may include solid-state batteries, such as solid-state batteries comprising a lithium ceramic material and a solid electrolyte. Such batteries may advantageously help the portable speaker systems to endure the relatively high temperatures that may arise at, for example, a central location of a vehicular dashboard.

For some embodiments, portable speaker systems may include temperature sensors which may aid in determining whether a temperature of the portable speaker system or a component therein (such as a battery of the speaker system) has exceeded a predetermined threshold temperature. Upon detecting a temperature in excess of such a threshold, the portable speaker system may drain at least a portion of charge in the battery, which may advantageously enhance a quality and/or reliability of the portable speaker system.

Accordingly, portable speaker systems as disclosed herein may advantageously be suitable to function both as a portion of a vehicular audio system, and as a stand-alone audio system. This may increase a ready availability of a portable speaker system for users of the vehicle once a destination has been reached, without burdening the users with a device that may become superfluous upon reentering the vehicle.

In some embodiments, the issues described above may be addressed by methods comprising attaching a speaker to an internal speaker receptacle of a vehicle. The speaker may then be coupled to an audio amplifier (e.g., to receive audio performances played through the audio amplifier), and the coupled speaker may itself play the audio performances so received. The methods may also comprise decoupling the speaker from the audio amplifier, detaching the speaker from the internal speaker receptacle of the vehicle, and subsequently playing one or more audio performances received from a Bluetooth-compliant wireless interface coupled to the speaker, through the decoupled speaker. In this way, a speaker may be attached and coupled to a vehicular audio system for purposes of enjoyment within the vehicle, and may be decoupled and detached from the vehicular audio system for purposes of enjoyment outside the vehicle, in support of a technical solution of providing enjoyment of the same speaker whether within or outside of a vehicle.

For some embodiments, methods of actively configuring a portable speaker may comprise coupling a portable speaker to an audio amplifier of a vehicle upon an attachment of the portable speaker to a dashboard speaker receptacle of the vehicle. A first audio performance may be played through the portable speaker while the portable speaker is coupled to the audio amplifier, the first audio performance being received over a wired interface of the vehicle. Thereafter, the portable speaker may be decoupled from the audio amplifier of the vehicle (e.g., upon a detachment of the portable speaker from the speaker receptacle), and a second audio performance may be played through the portable speaker while the portable speaker is decoupled from the audio amplifier, the second audio performance being received over a Bluetooth-compliant wireless interface of the portable speaker. In this way, a portable speaker may be coupled to an audio amplifier upon being attached to a dashboard speaker receptacle, then decoupled from the audio amplifier upon being detached from the dashboard speaker receptacle, in support of a technical solution of providing enjoyment of a portable speaker both when coupled to a vehicular audio system and when serving as a stand-alone audio system.

For some embodiments, an actively configuring portable speaker system for a vehicle may comprise one or more speakers, a solid-state battery, a wired interface for receiving audio performances provided by the vehicle, and a wireless interface for receiving audio performance provided by a wirelessly-connected audio source. A processing circuitry of the portable speaker system may detect that the portable speaker system has been attached to an internal speaker receptacle of a vehicle, then play an audio performance received through the wired interface over the one or more speakers, while the portable speaker system is attached to the internal speaker receptacle. The processing circuitry may also detect that the portable speaker system has been detached from the internal speaker receptacle of the vehicle, then play an audio performance received through the wireless interface over the one or more speakers, while the portable speaker system is detached from the internal speaker receptacle. In this way, a technical solution of providing enjoyment of a portable speaker system both as part of a vehicular audio system, via a wired interface, and as a stand-alone speaker system, via a wireless interface.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 1A shows a front perspective view of a vehicular audio system in a first state, in accordance with one or more embodiments of the present disclosure;

DETAILED DESCRIPTION

Figure 1B:
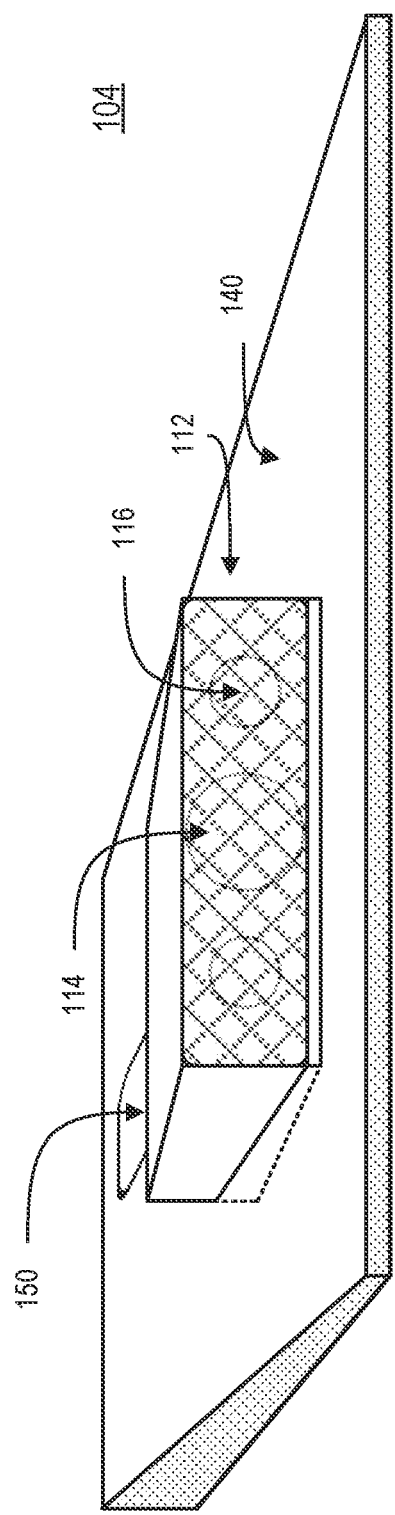
FIG. 1B shows a front perspective view of the vehicular audio system of FIG. 1A in a second state, in accordance with one or more embodiments of the present disclosure.
Figure 2:
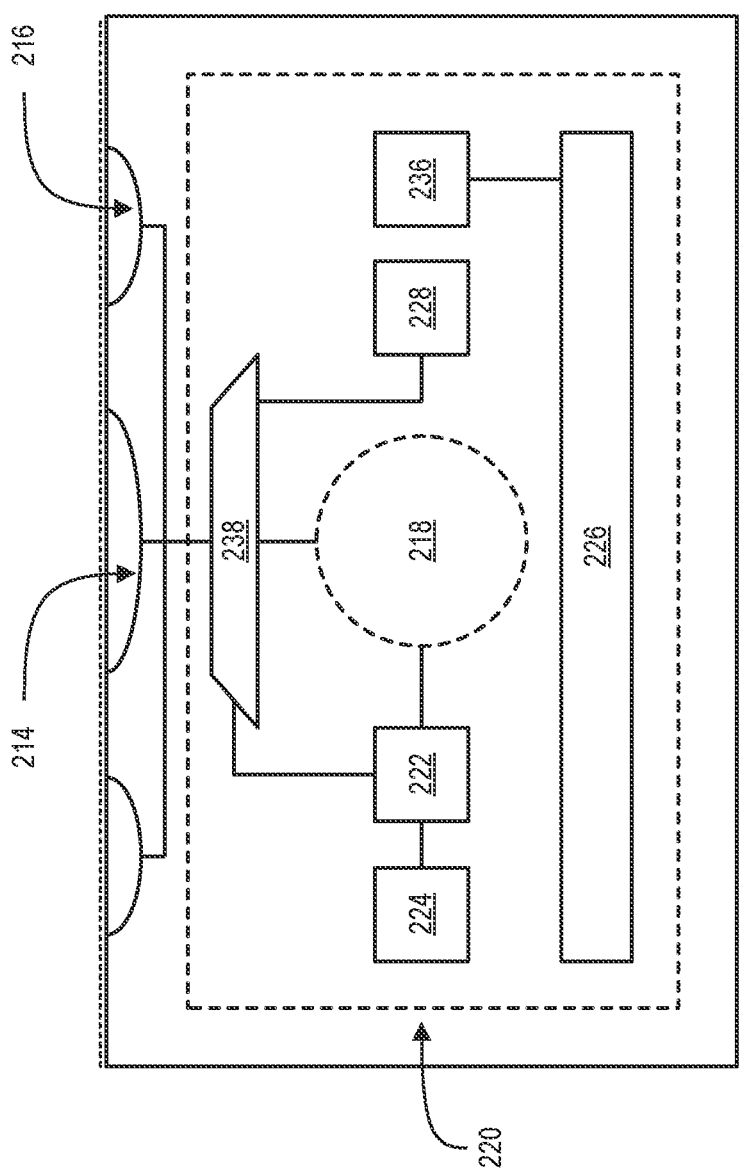
FIG. 2 shows a block diagram of portions of a portable speaker system, in accordance with one or more embodiments of the present disclosure.
Figure 3:
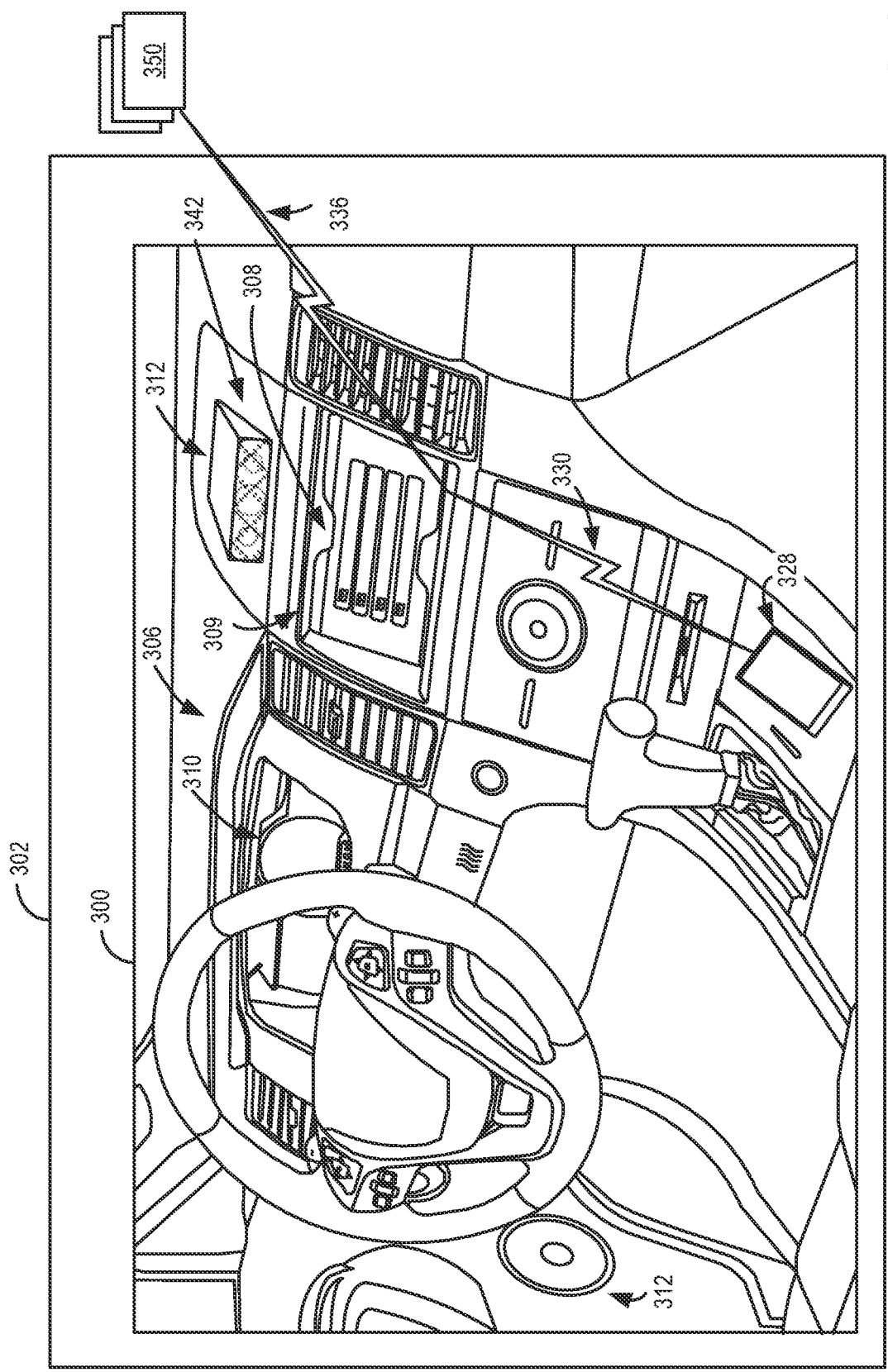
FIG. 3 shows an example partial view of an interior of a cabin of a vehicle, in accordance with one or more embodiments of the present disclosure.
Figure 4:
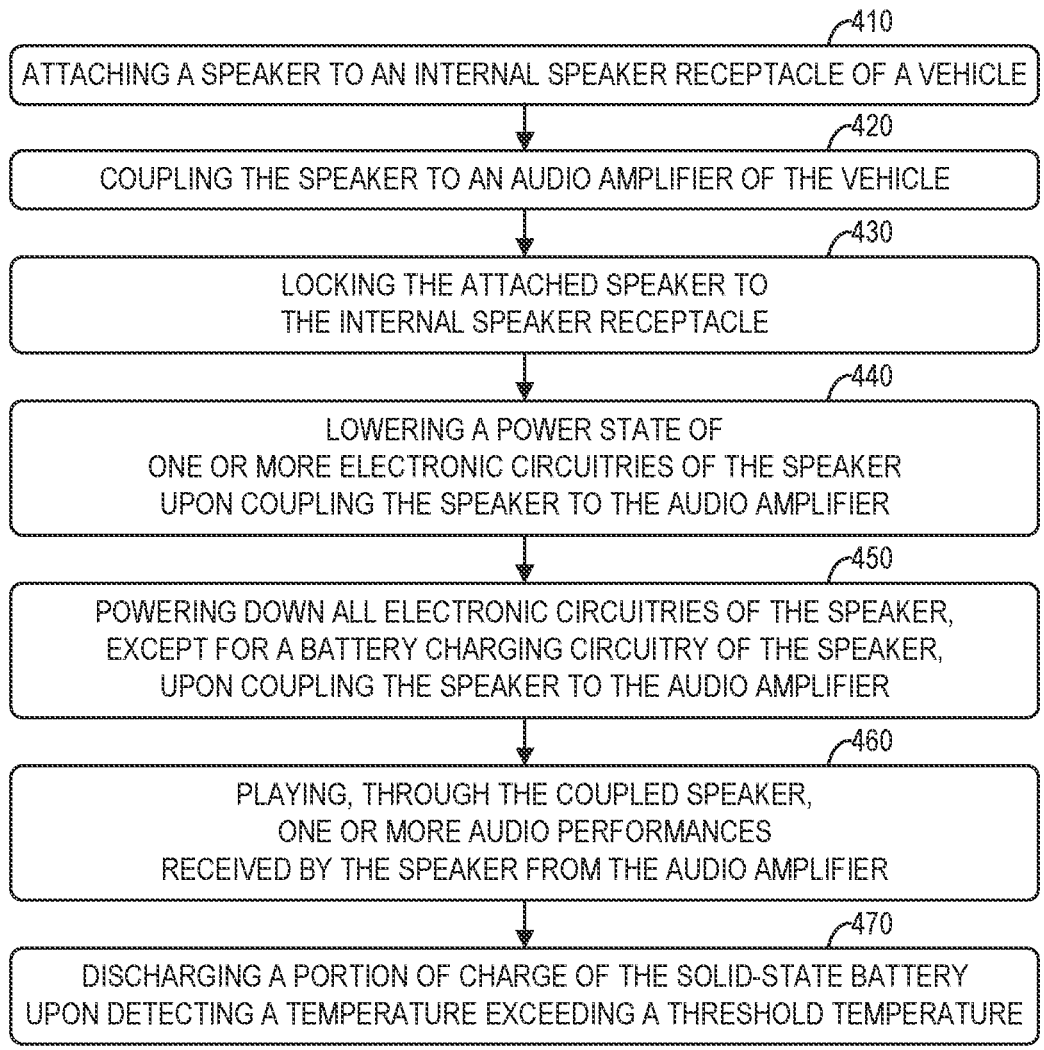
FIGS. 4-5 show methods for actively configuring speaker systems, in accordance with one or more embodiments of the present disclosure.
Figure 5:
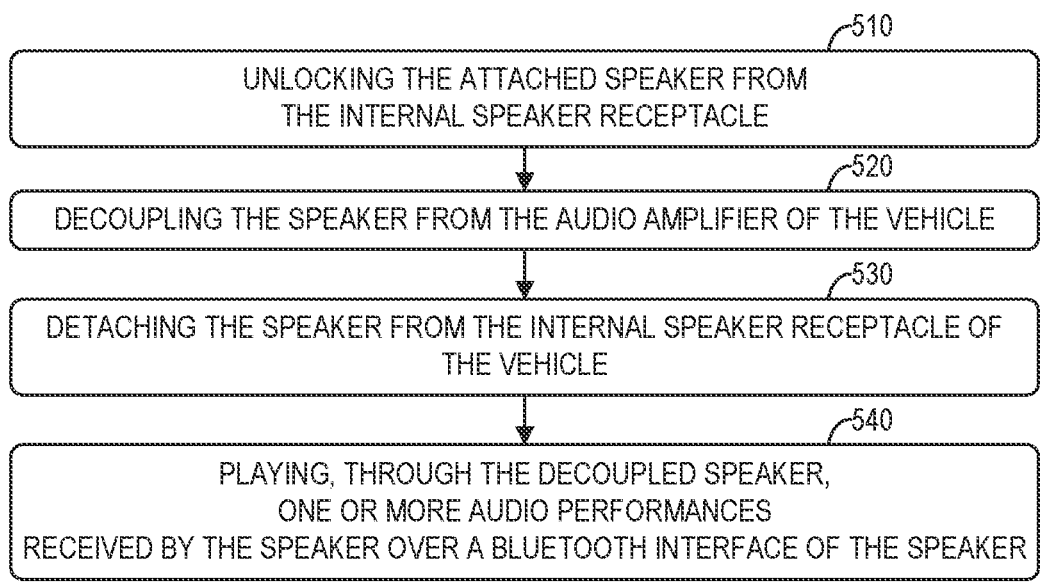

Disclosed herein are various systems and methods for actively configuring portable speaker systems for mixed-mode usage, both as part of a vehicular audio system and as a stand-alone audio system. FIGS. 1A and 1B show perspective views of a portable speaker system and a portion of a vehicular panel for receiving the portable speaker system. FIG. 2 shows a block diagram of various components and features of such a portable speaker system. FIG. 3 shows an example usage model, within a vehicle, of the portable speaker system. FIGS. 4 and 5 show methods for actively configuring portable speaker systems, and actively configuring speakers thereof.

FIG. 1A shows a front perspective view of a vehicular audio system 100 in a first state 102. Audio system 100 comprises a portable speaker system 112 and a vehicular panel 140. In various embodiments, portable speaker system 112 comprises a speaker 114, and may comprise one or more additional speakers 116. Vehicular panel 140 may be at least part of an internal cabin-facing portion of a vehicle, such as a dashboard.

Vehicular panel 140 has a receptacle 142 which may be, or may include, an indentation in the vehicular panel. For example, in various embodiments, receptacle 142 may be an indented portion of a surface of a vehicle dashboard. Receptacle 142 may be shaped and/or configured to accept the placement and/or seating of portable speaker system 112 therein. In some embodiments, vehicular panel 140 may be positioned in a central portion of a dashboard, which may advantageously maximize an accessibility of receptacle 142 (e.g., for placing portable speaker system 112 therein and/or removing portable speaker system 112 therefrom).

Portable speaker system 112 may also comprise an interfacing region 118, and receptacle 142 may comprise a corresponding interfacing region 148. In various embodiments, interfacing region 148 comprises an interface to an audio amplifier on the other side of vehicular panel 140 (e.g., embedded within the vehicle). Interfacing region 118 may mechanically interface with interfacing region 148, thereby mechanically attaching and/or securing portable speaker system 112 to and/or against receptacle 142. Interfacing region 118 may also electrically and/or electronically interface with interfacing region 148, thereby electrically and/or electronically coupling and/or connecting portable speaker system 112 to receptacle 142 (and/or to the audio amplifier beyond).

In first state 102, portable speaker system 112 and its components may be separated from or spaced from receptacle 142 of vehicular panel 140, and may accordingly be detached from receptacle 142. In first state 102, portable speaker system 112 may be electrically and/or electronically uncoupled from receptacle 142, and as a result, portable speaker system 112 may be disconnected from the audio amplifier of the vehicle.

FIG. 1B shows a front perspective view of vehicular audio system 100 in a second state 104. At some point, a user of portable speaker system 112 may wish to dock portable speaker system 112 within receptacle 142, thus causing a transition from first state 102 to second state 104. In transitioning from first state 102 to second state 104, portable speaker system 112 has been seated and/or placed within receptacle 142 with sufficient urging to mechanically attach interfacing region 118 and interfacing region 148, thereby mechanically attaching and/or securing portable speaker system 112 to and/or against receptacle 142.

The urging of portable speaker system 112 into receptacle 142 has also been sufficient to electrically and/or electronically couple interfacing region 118 and interfacing region 148, thereby electrically and/or electronically coupling and/or connecting portable speaker system 112 to receptacle 142. The electrical and/or electronic coupling of portable speaker system 112 to receptacle 142 (through interfacing region 118 and interfacing region 148) has thereby created an electrical and/or electronic coupling of portable speaker system 112 and its components to the audio amplifier on the other side of vehicular panel 140.

In various embodiments, portable speaker system 112 may comprise a battery coupled to one or more of its components and/or component electronic circuitries, in order to supply power to the components and/or component electronic circuitries of portable speaker system 112. In some embodiments, the battery may include a solid-state battery. For some embodiments, the battery may include a solid-state battery comprising a lithium ceramic material and a solid electrolyte.

In various embodiments, the electrical and/or electronic coupling of portable speaker system 112 to receptacle 142 in second state 104 may result in receptacle 142 exerting control over and/or supplying power to the various speakers of portable speaker system 112. Following the transition to second state 104, audio performances initiated in the vehicle (such as through an infotainment system of the vehicle, and/or a device connected to the infotainment system) may be amplified by the vehicle's audio amplifier, and may be supplied from the audio amplifier, through a wired audio interface of interfacing region 118 and interfacing region 148, to portable speaker system 112 and its components. The speakers of portable speaker system 112 may thereafter play the audio performances supplied from the audio amplifier, with power supplied by the audio amplifier.

Since the relevant control and/or power for the components of portable speaker system 112—such as speaker 114, and any additional speakers 116—may be supplied from vehicle (e.g., via the audio amplifier of the vehicle and/or other systems of the vehicle), portable speaker system 112 may be able to reduce or eliminate power supplied from a battery of portable speaker system 112 to other components thereof, as described in further herein.

Accordingly, once portable speaker system 112 has been electrically and/or electronically coupled to the audio amplifier of the vehicle, portable speaker system 112 may lower a power state of one or more of its electronic circuitries. In some embodiments, upon being electrically and/or electronically coupled to the audio amplifier, portable speaker system 112 may lower a power state of, and/or may power down, substantially all of its component electronic circuitries, with the exception of a battery charging circuitry therein. Thereafter, the battery charting circuitry may control the charging of the battery of portable speaker system 112 (e.g., based on power supplied by the vehicle, through interfacing region 148 and interfacing region 118), and the audio amplifier of the vehicle may control and supply power to speakers of portable speaker system 112 (e.g., to drive the speakers).

In some embodiments, portable speaker system 112 may comprise a temperature sensor operable to detect a temperature (e.g., of portable speaker system 112, or of a battery of portable speaker system 112). In such embodiments, portable speaker system 112 may be operable to discharge a portion of charge from a battery of portable speaker system 112 upon determining that the detected temperature exceeds a threshold temperature.

In various embodiments, the mechanical attachment of portable speaker system 112 to receptacle 142, and/or the electric and/or electronic coupling of portable speaker system 112 to receptacle 142, may include a locking and/or latching of portable speaker system 112 against and/or to receptacle 142. In some embodiments, mechanically interlocking portions of interfacing region 118 and interfacing region 148 may engage with each other to encourage a firm seating of portable speaker system 112 within receptacle 142.

At some point, a user of portable speaker system 112 may wish to remove portable speaker system 112 from receptacle 142, thus causing a transition from second state 104 back to first state 102. In various embodiments, preparatory activities external to portable speaker system 112 might be completed first (such as by controlling receptacle 142 in order to facilitate a graceful electrical and/or electronic decoupling of portable speaker system 112 from being controlled by governing receptacle 142). In some embodiments, activities to physically remove portable speaker system 112 from receptacle 142 may proceed following the pressing of an ejection control 150 of vehicular panel 140. In some embodiments, ejection control 150 may be a mechanical button, while for some embodiments, ejection control 150 may a touch-sensitive control, or a portion of a touch-screen of the vehicle. For some embodiments, activities to physically remove portable speaker system 112 from receptacle 142 may be otherwise initiated, such as through an infotainment system of the vehicle and/or a device connected to the infotainment system.

Following the initiation of activities to physically remove portable speaker system 112 from receptacle 142, in transitioning from second state 104 to first state 102, interfacing region 118 and interfacing region 148 may be decoupled, thereby electrically and/or electronically decoupling and/or disconnecting portable speaker system 112 from receptacle 142. The electrical and/or electronic decoupling of portable speaker system 112 from receptacle 142 (through interfacing region 118 and interfacing region 148) may thereby result in the electrical and/or electronic decoupling of portable speaker system 112 and its components from the audio amplifier on the other side of vehicular panel 140. Interfacing region 118 and interfacing region 148 may also mechanically detach from each other, thereby mechanically detaching portable speaker system 112 from receptacle 142. In various embodiments, a portion of vehicular panel 140 (e.g., within receptacle 142) may urge a modest physical separation between portable speaker system 112 and receptacle 142, which may advantageously facilitate easy handling of portable speaker system 112 and removal from receptacle 142.

Once portable speaker system 112 has been electrically and/or electronically decoupled from the audio amplifier of the vehicle, portable speaker system 112 may raise a power state of one or more of its electronic circuitries. For some embodiments, upon being electrically and/or electronically decoupled from the audio amplifier, portable speaker system 112 may raise a power state of, and/or may power up, substantially all of its component electronic circuitries.

In various embodiments, following the transition to first state 102, relevant control and/or power for the components of portable speaker system 112 (e.g., speaker 114 and any additional speakers 116) may no longer be supplied from the audio amplifier. Instead, portable speaker system 112 may receive audio performances over a wireless communications link, such as a wireless communication link compliant with one or more of a Bluetooth® Classic or Bluetooth® Basic Rate/Enhanced Data Rate (BR/EDR) specification, or a Bluetooth® Low Energy specification. For various embodiments, the wireless communication link may be compliant with one or more of revision 2.0 and/or revision 4.0 of the Bluetooth® core specification. The speakers of portable speaker system 112 may thereafter play the audio performances received over the wireless communication link, with power supplied by a batter of the portable speaker system 112.

For various embodiments, the electric and/or electronic decoupling of portable speaker system 112 from receptacle 142, and/or the mechanical detachment of portable speaker system 112 from receptacle 142, may include an unlocking and/or unlatching of portable speaker system 112 from receptacle 142. In some embodiments, mechanically interlocking portions of interfacing region 118 and interfacing region 148 may disengage from each other to permit a ready removal of portable speaker system 112 from receptacle 142.

In FIGS. 1A and 1B, although vehicular audio system 100 is depicted as having a single interfacing region 118 and a single interfacing region 148, in various embodiments, vehicular audio system 100 may have more than one interfacing region 118 and more than one respectively corresponding interfacing region 148. In such embodiments, one or more interfacing regions 118 may mechanically interface with one or more interfacing regions 148, while one or more interfacing regions 118 may electrically and/or electronically interface with one or more interfacing regions 148, as discussed above. Accordingly, in various embodiments, one or more interfacing regions 118 and one or more respectively corresponding interfacing regions 148 may mechanically interface with each other, or may electrically and/or electronically interface with each other, or both.

As disclosed, portable speaker system 112 may accordingly integrate with an audio system of the vehicle, such as by being used by the audio amplifier to serve as a central speaker of the vehicle. For various embodiments, portable speaker system 112 may also be paired with one or more other portable speaker systems, and the other portable speaker systems may also be used by the audio amplifier to serve as other speakers of the vehicle.

FIG. 2 shows a block diagram of portions of a portable speaker system 212 (which may be substantially similar to portable speaker system 112 disclosed herein). As depicted, portable speaker system 212 comprises a speaker 214, and in various embodiments, portable speaker system 212 may comprise one or more additional speakers 216. Portable speaker system 212 may also comprise a processing circuitry 220.

In various embodiments, processing circuitry 220 may comprise custom-designed logic devices or circuitry to perform various operations. For some embodiments, processing circuitry 220 may comprise at least one or more processors 222, a memory 224, and a power source 226 (e.g., a battery, such as disclosed herein), which may be arranged to perform various operations of processing circuitry 220. In some embodiments, one or more devices or circuits of processing circuitry 220 may be implemented by combinations of logic devices, circuitry, other hardware elements, and/or software-configured elements. In some embodiments, processors 222 may include a central processor (CPU). For some embodiments, processors 222 may include other electronic components capable of carrying out processing functions, such as one or more field-programmable gate arrays (FPGAs), digital signal processors, and/or graphics components.

Processing circuitry 220 may comprise an interfacing region 218 (which may be substantially similar to interfacing region 118). Interfacing region 218 may be operable to mechanically attach, and to electrically and/or electronically couple and/or connect to, a corresponding interface region of a vehicular panel (such as interfacing region 148 of vehicular panel 140).

When coupled to a vehicular audio amplifier (e.g., through interfacing region 218 and a corresponding interface region of a vehicular panel), portable speaker system 212 may be operable to receive audio performances supplied by a vehicular audio amplifier through a wired audio interface of interfacing region 218. When coupled to the vehicular audio amplifier, speaker 214 (and/or one or more additional speakers 216) may be powered by and/or driven by the audio amplifier, and various electronic circuitries of portable speaker system 212 may be placed in a lower power state and/or may be powered down, with the exception of a circuitry for controlling a battery charging operation.

In contrast, when decoupled from the vehicular audio amplifier, portable speaker system 212 may be operable to receive audio performances supplied over a wireless communications link (which may be compliant with one or more Bluetooth® specifications, as disclosed herein) implemented by a wireless circuitry 228. When decoupled from the vehicular audio amplifier, speaker 214 (and/or one or more additional speakers 216) may be powered by and/or driven by power source 226.

A selection circuitry 238 may determine when portable speaker system 212 mechanically attached to a corresponding interface region of a vehicular panel, and/or whether the portable speaker system 212 is electrically and/or electronically coupled and/or connected to the corresponding interface region of the vehicular panel. When selection circuitry 238 determines that interfacing region 218 is mechanically attached and/or coupled to the vehicular interface region, selection circuitry 238 may select to supply audio performances to speaker 214 (and/or one or more additional speakers 216) from the wired audio interface of interfacing region 218. When interfacing region 218 is determined to be attached to and/or coupled to the vehicular interface region, selection circuitry 238 may also select to supply power to speaker 214 (and/or one or more additional speakers 216) from the audio amplifier (e.g., via the wired audio interface of interfacing region 218), and may initiate a transition to a lower-power state and/or a power-down of various electronic circuitries of portable speaker system 112.

In contrast, when selection circuitry 238 determines that interfacing region 218 is mechanically detached and/or decoupled from the vehicular interface region, selection circuitry 238 may select to supply performances to speaker 214 (and/or one or more additional speakers 216) from wireless circuitry 228. When interfacing region 218 is determined to be detached from and/or decoupled from the vehicular interface region, selection circuitry 238 may also initiate a transition to a higher-power state and/or a power-up of various electronic circuitries of portable speaker system 212, and may select to supply power to speaker 214 (and/or one or more additional speakers 216)—as well as to other electronic circuitries of portable speaker system 212—from power source 226.

In various embodiments, portable speaker system 212 may comprise a temperature sensor circuitry 236 operable to detect a temperature on behalf of processing circuitry 220. If processing circuitry 220 determines that a detected temperature exceeds a threshold temperature, processing circuitry 220 may operate to at least partially discharge power source 226.

FIG. 3 shows an example partial view of an interior of a cabin 300 of a vehicle 302, in which a driver and/or one or more passengers may be seated. Vehicle 302 may be a motor vehicle such as an automobile, among other types of vehicles. In some embodiments, a propulsion system of Vehicle 302 may include internal combustion engine for powering the vehicle using fossil fuels. For some embodiments, a propulsion system of vehicle 302 may include fuel cells, solar energy capturing elements, and/or other energy storage systems for powering the vehicle using electricity. In some embodiments, vehicle 302 may include a hybrid propulsion system, which may include an energy conversion device operable to absorb energy from vehicle motion and/or the engine and convert the absorbed energy to an energy form suitable for storage by an energy storage device.

As shown, a dashboard 306 may include various displays and controls accessible to a driver, or user, of vehicle 302. For example, dashboard 306 may include a touch screen 308 of an in-vehicle computing system 309 (e.g., an infotainment system), an audio system control panel, and an instrument cluster 310. Touch screen 308 may receive user input to the in-vehicle computing system 309 for controlling audio output, visual display output, user preferences, control parameter selection, and so on.

While the example system shown in FIG. 3 includes audio system controls that may be performed via a user interface of in-vehicle computing system 309 (such as touch screen 308) without a separate audio system control panel, in other embodiments, the vehicle may include an audio system control panel, which may include controls for a conventional vehicle audio system such as a radio, compact disc player, MP3 player, and so on. The audio system controls may include features for controlling one or more aspects of audio output via one or more speakers 312 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 309 may adjust a radio station selection, a playlist selection, a source of audio input (e.g., from radio or CD or MP3), and so forth, based on user input received directly via touch screen 308, or based on data regarding the user (such as a physical state and/or environment of the user) received via external devices 350 and/or mobile device 328.

The audio system of the vehicle may include an audio amplifier (not shown) coupled to plurality of loudspeakers (not shown). In some embodiments, one or more hardware elements of in-vehicle computing system 309, such as touch screen 308, a display screen, various control dials, knobs and buttons, memory, processor(s), and any interface elements (e.g., connectors or ports) may form an integrated head unit that is installed in dashboard 306 of the vehicle. The head unit may be fixedly or removably attached in dashboard 306. In additional or alternative embodiments, one or more hardware elements of the in-vehicle computing system 309 may be modular and may be installed in multiple locations of the vehicle.

Cabin 300 may also include one or more user objects, such as mobile device 328, that are stored in the vehicle before, during, and/or after travelling. The mobile device 328 may include a smart phone, a tablet, a laptop computer, a portable media player, and/or any suitable mobile computing device. The mobile device 328 may be connected to the in-vehicle computing system via communication link 330. The communication link 330 may be wired (e.g., via Universal Serial Bus [USB], Mobile High-Definition Link [MHL], High-Definition Multimedia Interface [HDMI], Ethernet, and so on) or wireless (e.g., via Bluetooth®, WIFI, WIFI direct, Near-Field Communication [NFC], cellular connectivity, and so forth) and configured to provide two-way communication between the mobile device and the in-vehicle computing system. The mobile device 328 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 330 may provide sensor and/or control signals from various vehicle systems (such as vehicle audio system, climate control system, and so on) and the touch screen 308 to the mobile device 328 and may provide control and/or display signals from the mobile device 328 to the in-vehicle systems and the touch screen 308. The communication link 330 may also provide power to the mobile device 328 from an in-vehicle power source in order to charge an internal battery of the mobile device.

In-vehicle computing system 309 may also be communicatively coupled to additional devices operated and/or accessed by the user but located external to vehicle 302, such as one or more external devices 350. In the depicted embodiment, external devices are located outside of vehicle 302 though it will be appreciated that in alternate embodiments, external devices may be located inside cabin 300. The external devices may include a server computing system, personal computing system, portable electronic device, electronic wrist band, electronic head band, portable music player, electronic activity tracking device, pedometer, smartwatch, GPS system, and so forth. External devices 350 may be connected to the in-vehicle computing system via communication link 336 which may be wired or wireless, as discussed with reference to communication link 330, and configured to provide two-way communication between the external devices and the in-vehicle computing system. For example, external devices 350 may include one or more sensors and communication link 336 may transmit sensor output from external devices 350 to in-vehicle computing system 309 and touch screen 308. External devices 350 may also store and/or receive information regarding contextual data, user behavior/preferences, operating rules, and so on, and may transmit such information from the external devices 350 to in-vehicle computing system 309 and touch screen 308.

In-vehicle computing system 309 may analyze the input received from external devices 350, mobile device 328, and/or other input sources and select settings for various in-vehicle systems (such as climate control system or audio system), provide output via touch screen 308 and/or speakers 312, communicate with mobile device 328 and/or external devices 350, and/or perform other actions based on the assessment. In some embodiments, all or a portion of the assessment may be performed by the mobile device 328 and/or the external devices 350.

In some embodiments, one or more of the external devices 350 may be communicatively coupled to in-vehicle computing system 309 indirectly, via mobile device 328 and/or another of the external devices 350. For example, communication link 336 may communicatively couple external devices 350 to mobile device 328 such that output from external devices 350 is relayed to mobile device 328. Data received from external devices 350 may then be aggregated at mobile device 328 with data collected by mobile device 328, the aggregated data then transmitted to in-vehicle computing system 309 and touch screen 308 via communication link 330. Similar data aggregation may occur at a server system and then transmitted to in-vehicle computing system 309 and touch screen 308 via communication link 336 and/or communication link 330.

In various embodiments, vehicle 302 also accommodates a vehicular audio system as disclosed herein. For example, dashboard 306 comprises a vehicular panel with a receptacle 342 for receiving a portable speaker system 312 (which may be substantially similar to receptacle 142 and portable speaker system 112 disclosed herein). When portable speaker system 312 is attached to and/or coupled to receptacle 142, touch screen 308 and/or computing system 309 may be used to control portable speaker system 312, such as by providing audio performances to the audio amplifier, which in turn provides the performances to portable speaker system 312. Computing system 309 may prepare the audio amplifier of the vehicle for being coupled to portable speaker system 312 and/or for being decoupled from portable speaker system 312. Moreover, audio performances may be provided to portable speaker system 312 through the audio amplifier by computing system 309, mobile device 328, and/or external devices 350.

FIGS. 4-5 show methods for actively configuring speaker systems, in accordance with one or more embodiments of the present disclosure. A method 400 and a method 500 may comprise various parts, as discussed in further detail herein. Various parts of methods 400 and 500 may be carried out by a portable speaker system (such as portable speaker system 112, portable speaker system 212, and/or portable speaker system 312).

With reference to FIG. 4, in various embodiments, method 400 may comprise a first part 410, a second part 420, a third part 430, a fourth part 440, a fifth part 450, a sixth part 460, and/or a seventh part 470. Method 400 may comprise operations related to the attachment and/or coupling of a portable speaker system to a receptacle, as described herein.

In first part 410, a speaker may be attached to an internal speaker receptacle of a vehicle (such as through interfacing region 118). The speaker may be at least part of a portable, hand-held speaker system (such as speaker 114 of portable speaker system 112). The speaker system may include one or more additional speakers (such as additional speakers 116). The internal speaker receptacle may be located at a dashboard of the vehicle (such as receptacle 142), and a seating surface of the internal speaker receptacle comprises an indentation in the dashboard. For various embodiments, the attaching of the speaker to an internal speaker receptacle of a vehicle may comprise the seating of the speaker within the internal speaker receptacle of the vehicle. In some embodiments, the speaker may be coupled to the audio amplifier via a mechanical switch.

In second part 420, the speaker may be coupled to an audio amplifier of the vehicle, such as by being electrically and/or electronically coupled to the audio amplifier. In third part 430, the attached speaker may be locked to or against the internal speaker receptacle.

In fourth part 440, a power state of one or more electronic circuitries of the speaker may be lowered upon coupling the speaker to the audio amplifier. In fifth part 450, upon coupling the speaker to the audio amplifier, all electronic circuitries of the speaker, except for a battery charging circuitry of the speaker may be powered down. In sixth part 460, one or more audio performances received by the speaker from the audio amplifier may be played through the coupled speaker.

In various embodiments, the speaker may be coupled to a solid-state battery. For some embodiments, the solid-state battery may comprise a lithium ceramic battery with a solid electrolyte. In some embodiments, in seventh part 470, a portion of charge of the solid-state battery may be discharged upon detecting a temperature exceeding a threshold temperature.

With reference to FIG. 5, in various embodiments, method 500 may comprise a first part 510, a second part 520, a third part 530, and/or a fourth part 540. Method 500 may comprise operations related to the detachment and/or decoupling of a portable speaker system from a receptacle, as described herein, and methods 400 and 500 may alternate with each other.

In some embodiments, in first part 510, the attached speaker may be unlocked from the internal speaker receptacle. In second part 520, the speaker may be detached from the audio amplifier of the vehicle. For third part 530, the speaker may be detached from the internal speaker receptacle of the vehicle. In fourth part 540, one or more audio performances received by the speaker from a Bluetooth®—compliant wireless interface coupled to the speaker may be played through the decoupled speaker. In various embodiments, the Bluetooth®—compliant wireless interface may be compliant with revision 2.0 and/or revision 4.0 of the Bluetooth® core specification.

In various embodiments, one or more of the parts of method 400 and/or method 500 may be implemented by a processing circuitry (such as processing circuitry 220) during operation of a portable speaker system (such as portable speaker system 112). In some embodiments, the processing circuitry may include one or more processors and a non-transitory memory having instructions that, when executed by the one or more processors, cause the one or more processors to carry out part of, or all of, method 400 and/or method 500. Accordingly, instructions for carrying out method 400 and method 500 may be executed by one or more processors based on instructions stored on a memory of the one or more processors, and in conjunction with signals and/or information received from the wired interface with the audio amplifier.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the systems described above with respect to FIGS. 1-3. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure provides support for a method comprising: attaching a speaker to an internal speaker receptacle of a vehicle, coupling the speaker to an audio amplifier of the vehicle, playing, through the coupled speaker, one or more audio performances received by the speaker from the audio amplifier, decoupling the speaker from the audio amplifier of the vehicle, detaching the speaker from the internal speaker receptacle of the vehicle, and playing, through the decoupled speaker, one or more audio performances received by the speaker from a Bluetooth-compliant wireless interface coupled to the speaker. In a first example of the method, the method further comprises: lowering a power state of one or more electronic circuitries of the speaker upon coupling the speaker to the audio amplifier. In a second example of the method, optionally including the first example, the method further comprises: powering down all electronic circuitries of the speaker, except for a battery charging circuitry of the speaker, upon coupling the speaker to the audio amplifier. In a third example of the method, optionally including one or both of the first and second examples, the speaker is coupled to a solid-state battery. In a fourth example of the method, optionally including one or more or each of the first through third examples, the solid-state battery comprises a lithium ceramic battery with a solid electrolyte. In a fifth example of the method, optionally including one or more or each of the first through fourth examples, the method further comprises: discharging a portion of charge of the solid-state battery upon detecting a temperature exceeding a threshold temperature. In a sixth example of the method, optionally including one or more or each of the first through fifth examples, the speaker is coupled to the audio amplifier via a mechanical switch. In a seventh example of the method, optionally including one or more or each of the first through sixth examples, the attaching of the speaker to an internal speaker receptacle of a vehicle comprises the seating of the speaker within the internal speaker receptacle of the vehicle. In an eighth example of the method, optionally including one or more or each of the first through seventh examples, the internal speaker receptacle is located at a dashboard of the vehicle. In a ninth example of the method, optionally including one or more or each of the first through eighth examples, a seating surface of the internal speaker receptacle comprises an indentation in the dashboard. In a tenth example of the method, optionally including one or more or each of the first through ninth examples, the speaker is at least part of a portable, hand-held speaker system. In an eleventh example of the method, optionally including one or more or each of the first through tenth examples, the speaker system includes one or more additional speakers. In a twelfth example of the method, optionally including one or more or each of the first through eleventh examples, the Bluetooth-compliant wireless interface is compliant with at least one of: a revision 2.0 of the Bluetooth core specification and a revision 4.0 of the Bluetooth core specification. In a thirteenth example of the method, optionally including one or more or each of the first through twelfth examples, the method further comprises: locking the attached speaker to the internal speaker receptacle, and unlocking the attached speaker from the internal speaker receptacle. In this way, methods may enable a speaker system to have mixed-mode usage both to contribute to audio provided as part of a vehicular audio system, and to provide audio as a stand-alone, portable speaker system.

The disclosure also provides support for a method of actively configuring a portable speaker, the method comprising: coupling a portable speaker to an audio amplifier of a vehicle upon an attachment of the portable speaker to a dashboard speaker receptacle of the vehicle, playing a first audio performance through the portable speaker while the portable speaker is coupled to the audio amplifier, the first audio performance being received over a wired interface of the vehicle, decoupling the portable speaker from the audio amplifier of the vehicle upon an indication of a detachment of the portable speaker from the speaker receptacle, and playing a second audio performance through the portable speaker while the portable speaker is decoupled from the audio amplifier, the second audio performance being received over a Bluetooth-compliant wireless interface of the portable speaker. In a first example of the method, the method further comprises: lowering a power state of one or more electronic circuitries of the coupled portable speaker. In a second example of the method, optionally including the first example, the method further comprises: powering down all electronic circuitries of the coupled portable speaker except for a battery charging circuitry. In a third example of the method, optionally including one or both of the first and second examples, the portable speaker is coupled to a solid-state battery. In a fourth example of the method, optionally including one or more or each of the first through third examples, the solid-state battery comprises a lithium ceramic battery with a solid electrolyte. In a fifth example of the method, optionally including one or more or each of the first through fourth examples, the method further comprises: discharging a portion of charge of the solid-state battery upon detecting a temperature exceeding a threshold temperature. In a sixth example of the method, optionally including one or more or each of the first through fifth examples, the portable speaker is coupled to the audio amplifier via a mechanical switch. In a seventh example of the method, optionally including one or more or each of the first through sixth examples, the attaching of the portable speaker to the dashboard speaker receptacle comprises the seating of the portable speaker within the dashboard speaker receptacle of the vehicle. In an eighth example of the method, optionally including one or more or each of the first through seventh examples, a seating surface of the dashboard speaker receptacle is recessed within a surrounding surface of the dashboard. In a ninth example of the method, optionally including one or more or each of the first through eighth examples, the speaker is at least part of a portable, hand-held speaker system. In a tenth example of the method, optionally including one or more or each of the first through ninth examples, the speaker system includes one or more additional speakers. In an eleventh example of the method, optionally including one or more or each of the first through tenth examples, the Bluetooth-compliant wireless interface is compliant with at least one of: a revision 2.0 of the Bluetooth core specification and a revision 4.0 of the Bluetooth core specification. In a twelfth example of the method, optionally including one or more or each of the first through eleventh examples, the method further comprises: locking the attached portable speaker to the dashboard speaker receptacle, and unlocking the attached portable speaker from the internal speaker receptacle. In this way, methods of actively configuring a portable speaker may enable a speaker system to have mixed-mode usage both to contribute to audio provided as part of a vehicular audio system, and to provide audio as a stand-alone, portable speaker system.

The disclosure also provides support for an actively configuring portable speaker system for a vehicle, comprising: one or more speakers, a solid-state battery, a wired interface for receiving audio performances provided by the vehicle, a wireless interface for receiving audio performance provided by a wirelessly-connected audio source, one or more processors, and a non-transitory memory having executable instructions that, when executed, cause the one or more processors to: detect that the portable speaker system has been attached to an internal speaker receptacle of a vehicle, play an audio performance received through the wired interface over the one or more speakers, while the portable speaker system is attached to the internal speaker receptacle, detect that the portable speaker system has been detached from the internal speaker receptacle of the vehicle, and play an audio performance received through the wireless interface over the one or more speakers, while the portable speaker system is detached from the internal speaker receptacle. In a first example of the system, the speaker is coupled to a solid-state battery. In a second example of the system, optionally including the first example, the solid-state battery comprises a lithium ceramic battery with a solid electrolyte. In a third example of the system, optionally including one or both of the first and second examples, the system further comprises: a temperature detecting circuitry. In a fourth example of the system, optionally including one or more or each of the first through third examples, the internal speaker receptacle is located at a dashboard of the vehicle. In a fifth example of the system, optionally including one or more or each of the first through fourth examples, a seating surface of the internal speaker receptacle is recessed within a surrounding surface of the dashboard. In a sixth example of the system, optionally including one or more or each of the first through fifth examples, the speaker is at least part of a portable, hand-held speaker system. In a seventh example of the system, optionally including one or more or each of the first through sixth examples, the speaker system includes one or more additional speakers. In an eighth example of the system, optionally including one or more or each of the first through seventh examples, the Bluetooth-compliant wireless interface is compliant with at least one of: a revision 2.0 of the Bluetooth core specification and a revision 4.0 of the Bluetooth core specification. In this way, speaker systems may support mixed-mode usage both to contribute to audio provided as part of a vehicular audio system, and to provide audio as a stand-alone, portable speaker system.

As used herein, an element or step recited in the singular and proceeded with the word "a" or "an" should be understood as not excluding plural of said elements or steps, unless such exclusion is stated.

Furthermore, references to "one embodiment" or "one example" of the present disclosure are not intended to be interpreted as excluding the existence of additional embodiments that also incorporate the recited features.

As used herein, terminology in which "an embodiment," "some embodiments," or "various embodiments" are referenced signify that the associated features, structures, or characteristics being described are in at least some embodiments, but are not necessarily in all embodiments. Moreover, the various appearances of such terminology do not necessarily all refer to the same embodiments, and are not intended to be interpreted as excluding the existence of additional embodiments that also incorporate the recited features.

As used herein, terminology in which elements are presented in a list using "and/or" language means any combination of the listed elements. For example, "A, B, and/or C" may mean any of the following: A alone; B alone; C alone; A and B; A and C; B and C; or A, B, and C.

As used herein, the term "substantially similar to" is construed to mean the same as with a tolerance for variation that a person of ordinary skill in the art would recognize as being reasonable.

As used herein, terms such as "first," "second," "third," and so on are used merely as labels, and are not intended to impose numerical requirements or a particular positional order on their objects.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   attaching a speaker to an internal speaker receptacle of a vehicle;
   coupling the speaker to an audio amplifier of the vehicle to supply power to the speaker from the audio amplifier;
   playing, through the coupled speaker, one or more audio performances received by the speaker from the audio amplifier;
   decoupling the speaker from the audio amplifier of the vehicle;
   detaching the speaker from the internal speaker receptacle of the vehicle to supply power to the speaker from a battery coupled to the speaker; and
   playing, through the decoupled speaker, one or more audio performances received by the speaker from a Bluetooth-compliant wireless interface coupled to the speaker,
   wherein the battery is a lithium ceramic battery with a solid electrolyte.

2. The method of claim 1, further comprising:
   lowering a power state of one or more electronic circuitries of the speaker upon coupling the speaker to the audio amplifier.

3. The method of claim 1, further comprising:
   powering down all electronic circuitries of the speaker, except for a battery charging circuitry of the speaker, upon coupling the speaker to the audio amplifier.

4. The method of claim 1, wherein the internal speaker receptacle is located at a central portion of a dashboard of the vehicle, further comprising:
   discharging a portion of charge of the lithium ceramic battery upon detecting a temperature of the speaker attached to the internal speaker receptacle at the central portion of the dashboard of the vehicle exceeding a threshold temperature.

5. The method of claim 1,
   wherein the speaker is coupled to the audio amplifier via a mechanical switch.

6. The method of claim 1,
   wherein the speaker is at least part of a portable, hand-held speaker system; and
   wherein the portable, hand-held speaker system includes one or more additional speakers.

7. The method of claim 1,
   wherein the Bluetooth-compliant wireless interface is compliant with at least one of: a revision 2.0 of a Bluetooth core specification and a revision 4.0 of the Bluetooth core specification.

8. The method of claim 1, further comprising:
   locking the attached speaker to the internal speaker receptacle; and
   unlocking the attached speaker from the internal speaker receptacle.

9. A method of actively configuring a portable speaker, the method comprising:
   coupling the portable speaker to an audio amplifier of a vehicle upon an attachment of the portable speaker to a dashboard speaker receptacle of a dashboard of the vehicle;
   playing a first audio performance through the portable speaker while the portable speaker is coupled to the audio amplifier, with power supplied by the audio amplifier, the first audio performance being received over a wired interface of the vehicle;

decoupling the portable speaker from the audio amplifier of the vehicle upon an indication of a detachment of the portable speaker from the dashboard speaker receptacle; and playing a second audio performance through the portable speaker while the portable speaker is decoupled from the audio amplifier, with power supplied by a battery coupled to the portable speaker, the second audio performance being received over a Bluetooth-compliant wireless interface of the portable speaker, wherein the battery is a lithium ceramic battery with a solid electrolyte.

10. The method of actively configuring the portable speaker of claim 9, further comprising:

lowering a power state of all electronic circuitries of the coupled portable speaker except for a battery charging circuitry.

11. The method of actively configuring the portable speaker of claim 10, further comprising:

discharging a portion of charge of the lithium ceramic battery upon detecting a temperature exceeding a threshold temperature.

12. The method of actively configuring the portable speaker of claim 9, wherein the attachment of the portable speaker to the dashboard speaker receptacle comprises a seating of the portable speaker within the dashboard speaker receptacle of the vehicle; and wherein a seating surface of the dashboard speaker receptacle is recessed within a surrounding surface of the dashboard.

13. The method of actively configuring the portable speaker of claim 9, wherein the portable speaker is at least part of a portable, hand-held speaker system.

14. The method of actively configuring the portable speaker of claim 9, wherein the Bluetooth-compliant wireless interface is compliant with at least one of: a revision 2.0 of a Bluetooth core specification and a revision 4.0 of the Bluetooth core specification.

15. The method of actively configuring the portable speaker of claim 9, further comprising:

locking the coupled portable speaker to the dashboard speaker receptacle; and unlocking the coupled portable speaker from the dashboard speaker receptacle.

16. An actively configuring portable speaker system for a vehicle, comprising:

one or more speakers;

a lithium ceramic battery coupled to the one or more speakers;

a wired interface for receiving audio performances provided by the vehicle;

a wireless interface for receiving audio performance provided by a wirelessly-connected audio source, the wireless interface being compliant with at least one of: a revision 2.0 of a Bluetooth core specification and a revision 4.0 of the Bluetooth core specification;

one or more processors; and a non-transitory memory having executable instructions that, when executed, cause the one or more processors to:

detect that the portable speaker system has been attached to an internal speaker receptacle of the vehicle;

play audio performances received through the wired interface over the one or more speakers and provide power from an audio amplifier of the vehicle to the one or more speakers while the portable speaker system is attached to the internal speaker receptacle;

detect that the portable speaker system has been detached from the internal speaker receptacle of the vehicle; and play audio performances received through the wireless interface over the one or more speakers and provide power from the lithium ceramic battery to the one or more speakers while the portable speaker system is detached from the internal speaker receptacle.

17. The actively configuring portable speaker system of claim 16, wherein the lithium ceramic battery has a solid electrolyte, and wherein the executable instructions, when executed, further cause the one or more processors to:

lower a power state of all electronic circuitries of the portable speaker system except for a battery charging circuitry.

18. The actively configuring portable speaker system of claim 16, wherein the internal speaker receptacle is located at a dashboard of the vehicle and is recessed within a surrounding surface of the dashboard.

\* \* \* \* \*